PNEUMATIC MEANS FOR MAINTAINING TAPE IN CONTACT WITH TRANSDUCER
Filed Feb. 12, 1965

INVENTOR.
JOHANNES B. GROENEWEGEN
BY Christie, Parker & Hale
ATTORNEYS.

United States Patent Office 3,418,434
Patented Dec. 24, 1968

3,418,434

PNEUMATIC MEANS FOR MAINTAINING TAPE IN CONTACT WITH TRANSDUCER

Johannes B. Groenewegen, San Dimas, Calif., assignor to Consolidated Electrodynamics Corporation, Pasadena, Calif., a corporation of California Filed Feb. 12, 1965, Ser. No. 432,167
1 Claim. (Cl. 179—100.2)

ABSTRACT OF THE DISCLOSURE

There is described apparatus for maintaining magnetic tape in intimate contact with a magnetic transducer head at high tape velocities. Pneumatic pressure, either in the form of positive pressure applied to the surface of the tape at the point of contact with the magnetic gap, or by vacuum applied immediately adjacent the gap in the magnetic head, is utilized.

This invention relates to tape recording and reproducing systems, and particularly to the means for urging the tape against a magnetic recording and reproducing element.

One method of recording a length of magnetizable tape is to draw the tape across an electromagnetic transducer head assembly at a uniform linear velocity. The head assembly includes a magnetic core member having a non-magnetic gap over which the tape passes and is provided with a current conducting exciting element or coil to produce a magnetic field across the tape. During the recording operation, current flows in the coil in accordance with time variations of an intelligence to produce a time varying field in the core. The tape is magnetized in accordance with the time variation of intelligence.

In the past, more than one magnetized track has been recorded upon the tape with a varied amount and strength of the intelligence. Due to the strength variation of the signal, it is desirable in both recording and reproducing the intelligence on or from the tape that the linear velocity is kept constant and that the tape is held against the recording head as close as possible without applying excessive friction or wear to the tape.

The conventional magnetic recording tapes in use today are made from plastic such as polyester film that stretches when subjected to an application of tension by tape reels or by external devices. It is desirable to have as little variation in tension as possible to the tape since changes in the length of tape will change the time variations of the intelligence being recorded or reproduced on the tape and cause distortion.

In the past, it has been conventional to apply pressure to the tape by a felt shoe to force the tape against the magnetic head. This type of device has disadvantages as it tends to collect oxides, which change the friction between the felt shoe and the tape and allow flutter or tape speed variations to distort the recording or reproducing qualities of the system. The felt shoe is generally used in combination with tension applying devices that tend to cause tape wear and thereby reduce tape life.

While tension applying devices and pressure applying devices have been used on the tape in the past, these devices either singly or in combination are not successful in holding the tape against the magnetic head at speeds of the tape that are in the vicinity of 100 to 120 inches per second. At these tape speeds, a "lift-off" of the tape is common due to air that clings to the tape as it is drawn across the magnetic head. This air tends to act as a wedge to force the tape from the head which results in both tape flutter and a decrease in the level of the signal.

In accordance with my invention, many of the disadvantages of the known prior art are eliminated. Pressure is applied to the tape at a precise point on a magnetic head where it contacts the gaps of the core elements by a pneumatic device that is not affected by oxide build-up or wear and does not apply appreciable friction to the moving tape.

In terms of structure, my invention extends to a tape transport device that has a length of tape movable between the feeding and take-up reels. The tape abuts a magnetic head at a point at which the head has a pair of magnetic pole pieces that form a gap. A means for pneumatically urging the tape into engagement with the magnetic head is coupled with the head and permits the tape to abut the head at the pole piece gap without the application of mechanical pressure.

The present invention permits the pressure applied to the tape to be varied with a change in tape tension. The tape may be easily threaded past the pressure applying device. The present invention is easily adapted to present magnetic head construction without extensive redesign or construction.

The invention will become more clearly understood by reference to the accompanying drawings wherein.

Figure 1:
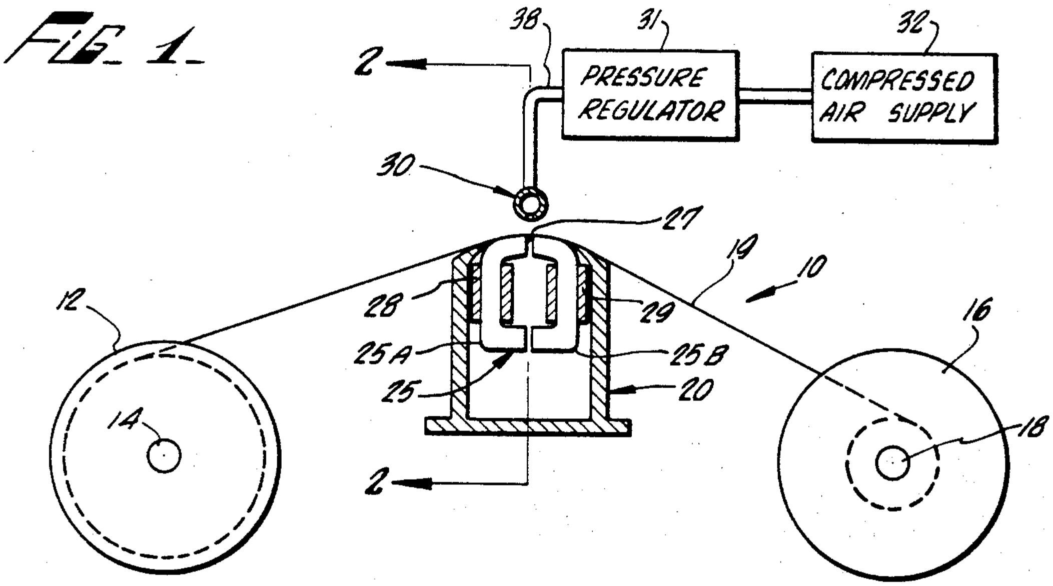
FIGURE 1 is a schematic elevation of a pressure applying device in accordance with the invention used in combination with a conventional tape transport system.
Figures 2, 3, 4:
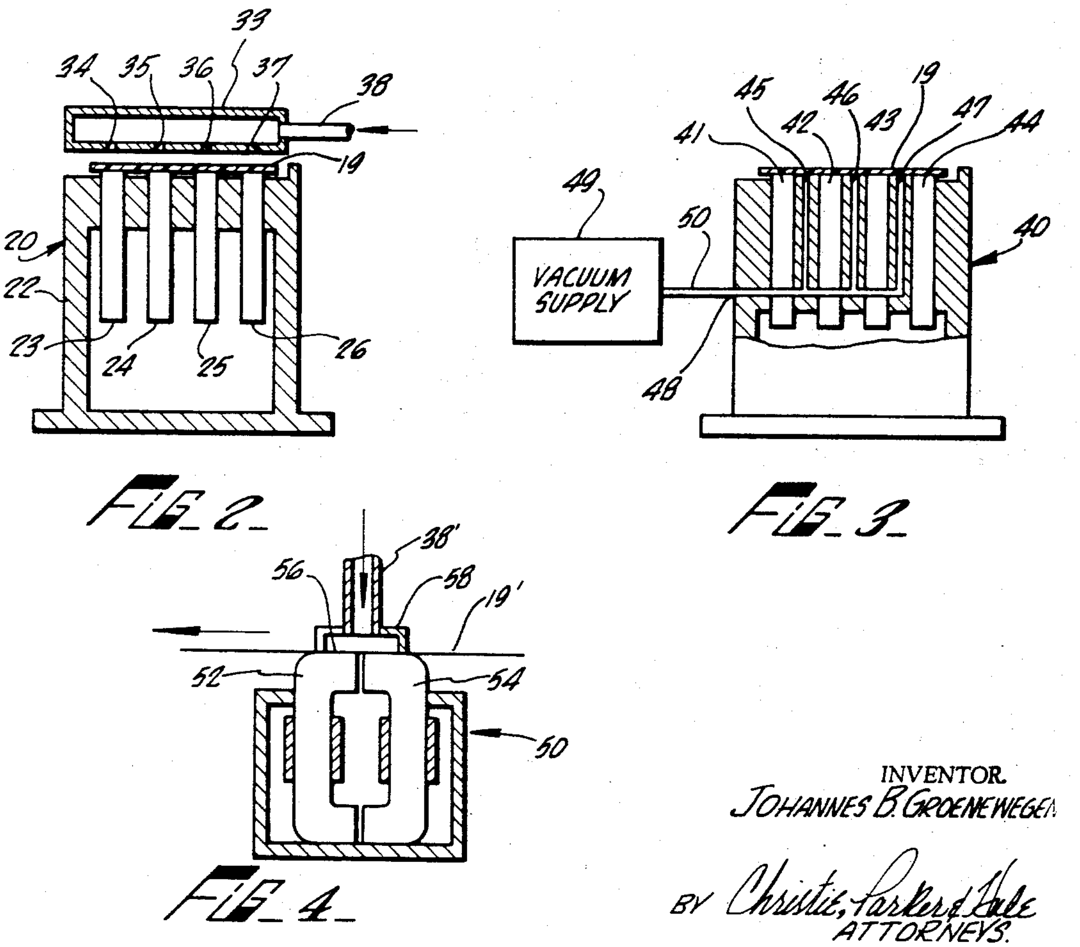
FIGURE 2 is a partial cross-sectional view taken along the line 2—2 of FIGURE 1 and shows a magnetic head and the pressure applying device acting upon a magnetic tape.
FIGURE 3 is an elevation alternative embodiment of the present invention illustrated in a partial longitudinal cross-sectional view through a magnetic head in which vacuum is applied to a magnetic tape.
FIGURE 4 is a partial cross-sectional view of another embodiment of the present invention with a pressure applying device for supplying pneumatic pressure.

Referring to FIGURES 1 and 2, a tape transport device 10 is provided with a take-up reel 12 removably mounted on a rotatable stud 14, and a feed reel 16 removably mounted on a stud 18. By rotating the stud 14, the take-up reel 12 draws a magnetic tape 19 from feed reel 16.

Recording or reproduction of magnetic sound to or from the tape 19 takes place between the reels 14 and 16. A means for recording and reproducing intelligence on or from the tape comprises a magnetic head 20. The head 20 includes a hollow frame 22 supporting and enclosing a plurality of cores 23, 24, 25, and 26. Details of one of the cores are illustrated in FIGURE 1 wherein the core 25 includes a pair of pole pieces 25A and 25B which converge to form a high reluctance gap 27 that faces the tape. A pair of coils 28 and 29 are respectively mounted on the pole pieces 25A and 25B.

A means for pneumatically urging the tape T against the magnetic head 20 takes the form of a pneumatic conduit 30 that is connected to a pressure regulator 31 and a compressed air supply 32. The pneumatic conduit 30 includes an enlarged head 33 containing a series of air vents 34, 35, 36, and 37 and a length of tubing 38 which is connected to and opening into the enlarged head 33 and the pressure regulator 31. As the supply generates compressed air, it is controlled by the regulator 31 and is ducted into the enlarged head 33 wherein the compressed air flows through the openings 34–37 and applies pressure directly at the gap 27 of each of the poles 23–26. Thus, the tape is forced against the magnetic head 20 and the force is only applied at the gaps of the respective cores to maintain the tape in intimate relation with the magnetic head at only that portion which will translate intelligence to or from the tape.

In the arrangement illustrated in FIGURE 3, a magnetic head 40, constructed in accordance with the present invention, has a plurality of cores 41, 42, 43, and 44 mounted therein in a conventional manner. The tape 19, illustrated in cross-section, abuts the upper portion of the magnetic head at the recording gap (not shown) of the cores.

A means for pneumatically urging the tape 19 against the magnetic head 40 takes the form of a vacuum system which sucks the tape against the magnetic head intermediate the points at which the magnetic cores engage the tape. The openings 45, 46, and 47 are disposed between each respective core 41, 42, 43, and 44 and form a manifold which has a common outlet 48. A vacuum supply 49 is coupled to the magnetic head 40 through a length of tubing 50 and thereby is able to evacuate the individual openings 45, 46, and 47 and suck the magnetic tape against the upper portion of the magnetic head 40.

In FIGURE 4 an alternative arrangement is shown which includes a magnetic head 50 across which the tape 19′ is directed. The magnetic head 50 is arranged so that the pole pieces 52 and 54 form a flat surface 56 across which the tape 19′ is directed. A small hood 58 is positioned immediately above the tape opposite the pole pieces 52 and 54. Air under pressure is directed through a tube 38′ into the space formed by the hood 58 about the tape 19′. The hood 58 is closed at the ends and forms slot-like openings with the head 50 through which the tape 19′ passes.

The tape is held against the flat surface of the magnetic head by the air pressure maintained under the hood 58. In this way, the tension in the tape is parallel to the flat surface of the magnetic head and therefore does not affect the contact pressure between the head and the magnetic tape. Contact pressure is controlled entirely by the air pressure build up under the hood 58 for holding the tape in intimate contact with the pole pieces. This arrangement permits more accurate control of contact pressure at all times and greatly reduces wear of the magnetic head in the region of the gap since a greater surface area of contact is provided between the magnetic head and the tape.

What is claimed is:

1. In a tape transport device in which magnetic tape is driven past a magnetic head, the combination comprising at least one magnetic head including a core having pole pieces that form a gap, the magnetic head being disposed with the gap of the pole pieces adjacent the tape, the portion of the magnetic head with the gap defining a smooth broad flat surface, the tape being directed in the plane of the flat surface such that changes in tension of the tape do not change the normal force between the tape and the flat surface of the head, and means coupled with the magnetic head for pneumatically urging the tape into engagement with the magnetic head, said means including a hood positioned adjacent the head and coextensive with said flat surface, the margins of the hood being spaced from the surface of the head by slightly more than the thickness of the tape to form slot-like openings with the head through which the tape passes, and means for maintaining air at an elevated pressure within the hood.

References Cited

UNITED STATES PATENTS 3,151,796 10/1964 Lipschutz ---------- 179—100.2
3,219,990 11/1965 Goehle ---------- 179—100.2

BERNARD KONICK, *Primary Examiner.*

J. R. GOUDEAU, *Assistant Examiner.*

U.S. Cl. X.R.

340—174.1